(12) United States Patent
Ben-Moshe et al.

(10) Patent No.: US 7,902,272 B2
(45) Date of Patent: Mar. 8, 2011

(54) HIGHLY DIFFRACTING, COLOR SHIFTING, POLYMERIZED CRYSTALLINE COLLOIDAL ARRAYS OF HIGHLY CHARGED POLYMER SPHERES, PAINTS AND COATINGS AND PROCESSES FOR MAKING THE SAME

(75) Inventors: Matti Ben-Moshe, Reut (IL); Sanford A. Asher, Pittsburgh, PA (US); Justin J. Bohn, Pittsburgh, PA (US)

(73) Assignee: The University of Pittsburgh of the Commonwealth System of High Education, Pittsburgh, PA (US)

( * ) Notice: Subject to any disclaimer, the term of this patent is extended or adjusted under 35 U.S.C. 154(b) by 653 days.

(21) Appl. No.: 11/818,778

(22) Filed: Jun. 15, 2007

(65) Prior Publication Data
US 2008/0108730 A1    May 8, 2008

Related U.S. Application Data

(60) Provisional application No. 60/814,635, filed on Jun. 16, 2006.

(51) Int. Cl.
*C09D 5/29* (2006.01)
(52) U.S. Cl. .......................................... 523/171; 523/223
(58) Field of Classification Search .................. 523/171, 523/223
See application file for complete search history.

(56) References Cited

U.S. PATENT DOCUMENTS

| | | | |
|---|---|---|---|
| 3,087,828 A | 4/1963 | Linton | |
| 3,087,829 A | 4/1963 | Linton | |
| 4,506,048 A * | 3/1985 | Bush et al. | 524/100 |
| 5,944,994 A | 8/1999 | Asher et al. | |
| 2003/0125416 A1 | 7/2003 | Munro et al. | |
| 2003/0232913 A1* | 12/2003 | Bakule | 524/500 |
| 2004/0094850 A1 | 5/2004 | Bonkowski et al. | |

FOREIGN PATENT DOCUMENTS

| | | |
|---|---|---|
| WO | WO 01/63345 A2 | 8/2001 |
| WO | WO 01/90260 A2 | 11/2001 |

OTHER PUBLICATIONS

Chad E. Reese, Carol D. Guerrero, Jesse M. Weissman, Kangtaek Lee, and Sanford A. Asher, Synthesis of Highly Charged, Monodisperse Polystyrene Colloidal Particles for the Fabrication of Photonic Crystals, Journal of Colloid and Interface Science, 232, 76-80 (2000), XP-002465917.

Chad E. Reese and Sanford A. Asher, Emulsifier-Free Emulsion Polymerization Produces Highly Charged, Monodisperse Particles for Near Infrared Photonic Crystals, Journal of Colloid and Interface Science, 248, 41-46 (2002), XP-002465918.

Nina V. Dziomkina and G. Julius Vancso, Colloidal Crystal Assembly on Topologically Patterned Templates, The Royal Society of Chemistry, 1, 265-279, (2005), XP-002465919.

* cited by examiner

*Primary Examiner* — Edward J Cain
(74) *Attorney, Agent, or Firm* — Thorp Reed & Armstrong LLP; Paul D. Bangor, Jr.; Stephen H. Montgomery

(57) ABSTRACT

One aspect of the present disclosure is directed towards a new film forming paint that Bragg diffracts light in the visible and NIR spectral regions. The paint may be comprised of highly charged polymer spheres that self assemble and maintain their diffraction in the presence of the different ingredients of the paint formulation, so that the self assembled arrays diffract light in both wet and dry states. Another aspect of the present invention is directed to a process for making highly charged polymeric spheres. Another aspect of the present invention is directed to the highly charged polymeric spheres themselves. The high surface charge density of the spheres enables the stability and self assembly of the spheres in the presence of the other paint ingredients. These spheres can find useful practical applications in paints, inks, coatings, cosmetics and light filtering applications. Because of the rules governing abstracts, this abstract should not be used to construe the claims.

28 Claims, No Drawings

HIGHLY DIFFRACTING, COLOR SHIFTING, POLYMERIZED CRYSTALLINE COLLOIDAL ARRAYS OF HIGHLY CHARGED POLYMER SPHERES, PAINTS AND COATINGS AND PROCESSES FOR MAKING THE SAME

CROSS-REFERENCE TO RELATED APPLICATIONS

The present application claims the benefit of U.S. application Ser. No. 60/814,635 entitled Highly diffracting, color shifting, polymerized crystalline colloidal arrays paint and coatings and a process for making the same, filed Jun. 16, 2006, the entirety of which is hereby incorporated by reference.

STATEMENT REGARDING FEDERALLY SPONSORED RESEARCH

This invention was made with government support under grant number 2 R01 DK55348-03A1 awarded by the NIH. The government has certain rights in the invention.

BACKGROUND

1. Field of the Disclosure

The present disclosure generally relates to paints, optical and specialty coating sensor materials that utilize the diffraction properties of photonic crystals.

2. Brief Description of Related Art

Color shifting paints and coatings have been proposed for numerous applications, including but not limited to, such applications as automobile paints to anti-counterfeiting inks for security documents and currency. These color shifting paints and coatings contain pigments that change their color upon variation of the angle of incident light, or when the angle of view is shifted. Several color shifting technologies has been proposed in the related art and are briefly described below.

For example, U.S. Pat. Nos. 3,087,828 and 3,087,829 disclose pearlescent pigments (interference pigments) that are comprised of synthetic or nonsynthetic mica particulates which are coated with a metal oxide layer(s). As a result of reflection and refraction of light and the angle of which the surface is observed, the particulates will show a pearl-like diffraction. The color of the light reflected by the particulates also depends on the thickness of the metal oxide coating on the particulates. The most common of the metal oxides used for coating the particulates are titanium and iron oxide which can be used in a single coat or in a mixed coating of the mica particulate. However, this color shifting technology yields low diffraction efficiency and also results in a relatively high cost.

United States Patent Application Publication Number 2003/0125416 discloses another color shifting technology, more specifically color effect composition pigments that provide a goniochromatic finish. These types of pigments are comprised of an ordered periodic array of monodisperse particles of defined thickness and surface area which are embedded in a polymer matrix. These types of pigments are similar to that of pearlescent pigments in that particulates of the ordered periodic structure are fixed into the matrix solution after their creation and incorporation into the matrix. A result of this is that a two step process is required. The particulate pigment flakes must be made first and then redispersed into a suitable matrix which will allow a film forming coating. This two steps process yields low diffraction efficiency due to relatively low crystalline array solid content and requires longer processing time and cost.

Additionally, diffraction patterns and holographs are also employed in color shifting applications due to their visual effects. This visual effect occurs when ambient light is diffracted from a diffraction grating. Diffraction gratings are repetitive structures made of lines or grooves in a material to form a periodic refractive index structure. Diffraction grating technology is employed in the formation of two-dimensional holographic patterns (for example United States Patent Application Publication Number 2004/094850 A1).

However, it is desirable to devise a non-expensive film forming color shifting paint and coating with a high diffraction efficiency. It is desirable to devise a non-expensive film forming paint that efficiently Bragg diffracts light in both wet and dry states in the visible and NIR spectral regions.

It has been recognized that crystalline colloidal arrays ("CCAs") diffract visible light according to Bragg's Law. CCAs are highly-ordered, three-dimensional arrays of monodisperse highly-charged particles that self assemble into a body-centered cubic (BCC) or face-centered cubic (FCC) lattice. CCAs Bragg-diffract light at wavelengths determined by the incident angle, the lattice spacing and the refractive index of the array. The lattice spacing of the array can be tuned, either by changing the particle size or the particle concentration, so that CCAs can efficiently diffract light in the visible and NIR spectral regions. Highly monodispersed polymer particles or spheres prepared by emulsion polymerization have been mainly utilized for this purpose due to their high monodispersity and high surface charge. Since the ordering of the CCAs depend on the electrostatic repulsion between the particles, the lattice will disorder in the presence of ionic impurities. Therefore, it is desirable to devise highly ordered CCAs of highly charged particles that maintain their diffraction in the presence of ionic impurities such as may be present in paint formulations.

Paints and coating formulations contain a film-forming material (resin). These film forming materials may be organic or inorganic and may form a film after the drying of the paint. The film forming material may be transparent or may contain pigments. The resin may hold the pigment particles close enough together and may attach them to the surface that they have been applied on. Some commonly applied film forming mechanisms in paints are: reaction with oxygen in air (oxidation), solvent evaporation and coalescence above the minimum film forming temperature (MFFT), and chemical cross-linking (polymerization).

It is desirable to devise a film forming paint and coatings that Bragg diffract light in the visible and NIR spectral regions. This, and other developments are a result of the present disclosure.

BRIEF SUMMARY

One aspect of the present disclosure is directed towards a method of making monodisperse highly charged spheres having preferred sizes in the 10 to 10,000 nanometer range and having a surface charge density of at least 2 $\mu C/cm^2$ and preferably greater than 10 $\mu C/cm^2$, through polymerization and comprising the steps of: maintaining the concentration of an initiator during polymerization to be approximately 1 wt. %; and maintaining the concentration of an ionic monomer during polymerization to be approximately 2 wt. %.

Another aspect of the present disclosure is directed towards a composition comprising highly charged polymeric spheres that can Bragg diffract light in both wet and dry states.

Another aspect of the present disclosure is the use of a composition comprising highly charged polymeric spheres that can Bragg diffract light in both wet and dry states in an application selected from the group consisting of paints, inks, coatings, cosmetics and light filtering applications.

Another aspect of the present disclosure is a composition comprising: highly charged polymeric spheres; at least one co-solvent; film forming monomers; and additives.

Further, an aspect of the present disclosure is a waterborne diffracting, color shifting paint, comprising: approximately 5-40 wt. % highly charged monodispersed polymeric particles; approximately 50-90 wt. % water; approximately 0-25 wt. % humectant; approximately 0-5 wt. % wetting agent; approximately 0-5 wt. % defoamer; approximately 5-40 wt. % film forming material; approximately 0-2 wt. % initiator; and fungicides.

Another aspect of the present disclosure is an organic based, diffracting, color shifting paint, comprised of: approximately 5-40 wt. % highly charged monodispersed polymeric particles; approximately 50-90 wt. % organic solvent; approximately 0-25 wt. % humectant; approximately 0-5 wt. % wetting agent; approximately 0-5 wt. % defoamer; approximately 5-40 wt. % film forming material, and approximately 0-2 wt. % initiator.

Further, an aspect of the present disclosure is a composition comprising: highly charged spheres; at least one co-solvent; film-forming monomers, oligomers or latexes; and additives.

Another aspect of the present disclosure is a waterborne diffracting, color shifting paint, comprising: approximately 5-40 wt. % highly charged monodispersed polymeric particles; approximately 50-90 wt. % water; approximately 0-25 wt. % nonionic cosolvent; approximately 0-5 wt. % nonionic wetting agent; approximately 0-5 wt. % nonionic defoamer; approximately 5-40 wt. % nonionic film forming material; approximately 0-10% nonionic crosslinking agent; approximately 0-10% nonionic coalescing agent; approximately 0-2% wt. initiator; and fungicides.

Another aspect of the present disclosure is an organic based, diffracting, color shifting paint, comprised of: approximately 5-40 wt. % highly charged monodispersed polymeric particles; approximately 50-90 wt. % organic solvent; approximately 0-25 wt. % cosolvent; approximately 0-5 wt. % wetting agent; approximately 0-5 wt. % defoamer; approximately 5-40 wt. % film forming material; and approximately 0-2 wt. % initiator.

Having briefly described the present disclosure, the above features and advantages thereof will be recognized by those skilled in the pertinent art from the following detailed description.

DETAILED DESCRIPTION

It is to be understood that the descriptions of the present disclosure have been simplified to illustrate elements that are relevant for a clear understanding of the present disclosure, while eliminating, for purposes of clarity, other elements that may be well known. Those of ordinary skill in the art will recognize that other elements are desirable and/or required in order to implement the present disclosure. However, because such elements are well known in the art, and because they do not facilitate a better understanding of the present disclosure, a discussion of such elements is not provided herein. Additionally, it is to be understood that the present disclosure is not limited to the embodiments described above, but encompasses any and all embodiments within the scope of the description and the following claims. Finally, the terms % and wt. % have been used herein interchangeably to mean weight percent.

One aspect of the present disclosure involves a new film forming paint that Bragg diffracts light in the visible and NIR spectral regions. The paint may be comprised of highly ordered CCAs of highly charged polymer spheres that self assemble and maintain their diffraction in the presence of the different ingredients of the paint formulation, so that the self assembled arrays diffract light in both wet and dry states.

Additionally, one aspect of the present invention is directed to a process for making highly charged polymeric spheres. This high surface charge density enables the stability and self assembly of the spheres in the presence of the other paint ingredients. The spheres preferably have sizes in the 10 to 10,000 nanometer range with a surface charge density of at least $2 \mu C/cm^2$. The highly charged polymeric spheres are made through polymerization and the process comprises the steps of: maintaining the concentration of an initiator during polymerization to be approximately 1 wt. %; and maintaining the concentration of an ionic monomer during polymerization to be approximately 2 wt. %. Maintaining the concentration of an initiator during polymerization enables the creation of the high surface charge. The initiator used is preferably an initiator that introduces acid groups to the surface of the spheres. For example, the initiator may be ammonium persulfate, potassium persulfate or disodium 2,2'-azobis-2-cyanopropane-1-sulphonate, to name a few. Additionally, the ionic monomer used is preferably an ionic monomer that introduces charged groups to the surface of the spheres. For example, the ionic monomer may be polymerizable surfactants, 1-sodium allyoxy hydroxypropyl sulfonate, 2-acrylamido-2-methylpropane sulfonic acid or styrene sulfonate, to name a few.

Further, the process for making the highly charged polymeric spheres may involve emulsion polymerization, dispersion polymerization, surfactant free polymerization, condensation and precipitation reactions. Additionally, the highly charged polymeric spheres may be selected from the groups consisting of organic polymers, metals, metal oxides, metal sulfides, core-shelled spheres and ferroelectric materials. More specifically, the highly charged polymeric spheres may include polystyrene, polymethyl methacrylate melamine formaldehyde resin, fluorinated methyl methacrylate, acrylic latexes, methacrylic latexes, vinyl ester latexes, polymer coated silica, polymer coated titania, polymer coated zinc sulfide, polymer coated zirconia, polymer coated aluminum oxide, polymer coated iron oxide, polymer coated cobalt oxide, polymer coated cadmium sulfide and polymer coated lead sulfide.

This process concept for increasing the particles surface charge density, can be applied to many emulsion polymerization processes such as those for synthesizing poly methyl methacrylate (PMMA, RI~1.48), polystyrene (PS, RI~1.59) or melamine formaldehyde resin particles (MF, RI~1.68). In the design of film forming color shifting paints the refractive index of the spheres are preferably tuned according to the film forming material used in order to increase the mismatch and optimize the modulation of the refractive index in order to increase the diffraction efficiency and obtain vivid colors in the dried paint. Upon cure of the paint the CCAs are locked in place as a highly ordered polymerized CCA that Bragg diffracts light.

The paint of the present disclosure has several advantages over known paints. For example, the paint of the present disclosure is a color shifting paint—meaning the color is different at different angle of view. Changing the particle size of the CCAs in the paint enables the diffracted color to be controlled. A layer of less than 10 μm is needed in order to essentially diffract all the light that hits the surface. An advantage of this color shifting paints relative to the other technologies is it being an inexpensive, one pot paint formulation that Bragg diffracts light in wet and dry states.

Unlike known color shifting technologies, the CCA of the present disclosure is stable in the paint formulation and not dispersed in the paint formulation as pre-prepared particulates. As opposed to known color shifting technologies that involve the mica flakes, the present disclosure is less expensive and provides higher diffraction efficiencies. Furthermore, the highly charged spheres of the present disclosure are highly stable in water compared to pigments based paints and upon drying of the paint the highly charged spheres of the present disclosure are essentially stable and not effected by UV radiation. The present disclosure may be utilized for aesthetic and cosmetic applications as well as specialty coatings for security documents for optical filters and sensing applications.

One aspect of the present disclosure is a waterborne diffracting, color shifting paint, comprising: approximately 5-40 wt. % highly charged monodispersed polymeric particles; approximately 50-90 wt. % water; approximately 0-25 wt. % humectant; approximately 0-5 wt. % wetting agent; approximately 0-5 wt. % defoamer; approximately 5-40 wt. % film forming material; approximately 0-2 wt. % initiator; and fungicides. Another aspect of the present disclosure is an organic based, diffracting, color shifting paint, comprised of: approximately 5-40 wt. % highly charged monodispersed polymeric particles; approximately 50-90 wt. % organic solvent; approximately 0-25 wt. % humectant; approximately 0-5 wt. % wetting agent; approximately 0-5 wt. % defoamer; approximately 5-40 wt. % film forming material, and approximately 0-2 wt. % initiator.

The monodispersed polymeric particles or colloid referred to above in both the waterborne and organic based diffracting, color shifting paints is highly charged with a surface charge density of at least $2.0 \pm 1.0\ \mu C/cm^2$. Further the colloid may be produced by an emulsion polymerization, dispersion polymerization or surfactant free emulsion polymerization process with grafted hydrophilic monomers containing hydroxyls, sulfonates or carboxylic charged groups. Additionally, the monomers used in both the waterborne or organic based diffracting color shifting paints may include, but are not be limited to, one of the following: styrene sulfonate, 2-hydroxy ethyl methacrylate (HEMA), n-isopropylacrylamide (NIPAM), 1-sodium allyoxy hydroxypropyl sulfonate (Sipomer COPS-1) and other acrylic and meta-acrylic acid derivatives to name a few.

With respect to the waterborne diffracting, color shifting paint, the humectant may be selected from, but not be limited to, one of the following: nonionic solvents such as monoethylene glycol, diethyleneglycol, polyethylene glycol (PEG) esters, polyethylene glycols (PEG), polypropylene glycols (PPG), glycerine, ethoxylated glycerine, sorbitol and polydextrose. With respect to the organic based diffracting, color shifting paint, the organic solvents may include monoethylene glycol, polyethylene glycol, diethylene glycol, dimethyl sulfoxide (DMSO), alcohols, and alkyl lactates, to name a few.

Both the waterborne and organic based diffracting, color shifting paints described above may have the ability to diffract light in both wet and dry states. The color of the paint may be determined by the size of the monodispersed particles. Particle sizes of 100-600 nm will diffract light in the visible and NIR spectral regions. The particle size of the crystalline colloidal array paint is selected so that the base coat material will diffract light in the desired visible or IR spectral regions. The color shifting coating of both the waterborne and organic based diffracting, color shifting paints may be cured thermally, using radiation or by reacting with oxygen. The aqueous basecoat film or film forming material of both the waterborne and organic based diffracting, color shifting paints may be optionally over-coated with a clear-coat material.

Further, the film forming material of the color shifting base coating of the waterborne diffracting, color shifting paint may be composed of nonionically stabilized polyurethane (saturated, unsaturated or surface grated with vinyl groups) acrylic or styrene-based solution or colloidal lattices. The film forming material of the color shifting base coating of the organic based diffracting, color shifting paint may be composed of natural resins (such as rosins, shellac, copals) or modified resins (phenolic modification, vinyl modification, silicone modification, epoxy or urethane modifications). The film forming material of both the waterborne and organic based diffracting, color shifting paints is selected so that the refractive index mismatch is maximized. The base coat of both the waterborne and organic based diffracting, color shifting paints may, in addition, have high refractive index nanoparticles dispersed within the base coat to give rise to the refractive index mismatch and thus keep high transmittance in the visible spectral region. The high refractive index nanoparticles may include, but are not limited to, titania, zinc sulfide, zirconia, to name a few.

Further, the base coat of both the waterborne and organic based diffracting, color shifting paints may have high refractive index nanoparticles dispersed within the base coat to give rise to the refractive index mismatch and thus keep high transmittance in the IR spectral region. The high refractive index nanoparticles may include, but are not limited to, titania, zinc sulfide, zirconia, CdS, CdTe, or other high refractive index semiconductors, to name a few.

Another aspect of the present invention is a waterborne diffracting, color shifting paint, comprising approximately 5-40 wt. % highly charged monodispersed polymeric particles, approximately 50-90 wt. % water, approximately 0-25 wt. % nonionic cosolvent, approximately 0-5 wt. % nonionic wetting agent, approximately 0-5 wt. % nonionic defoamer, approximately 5-40 wt. % nonionic film forming material, approximately 0-10% nonionic crosslinking agent, approximately 0-10% nonionic coalescing agent, approximately 0-2% wt. initiator and fungicides. Another aspect of the present invention is an organic based, diffracting, color shifting paint, comprised of approximately 5-40 wt. % highly charged monodispersed polymeric particles, approximately 50-90 wt. % organic solvent, approximately 0-25 wt. % cosolvent, approximately 0-5 wt. % wetting agent, approximately 0-5 wt. % defoamer, approximately 5-40 wt. % film forming material, and approximately 0-2 wt. % initiator.

The film forming material of the waterborne diffracting, color shifting paint and the an organic based, diffracting, color shifting paint, above may be nonionic urethane, melamine, acrylic or methacrylic derivatives in monomers, oligomers or latex form. Examples are polyurethane diols, Permax-Aliphatic polyether waterborne urethane polymers, Printrite or Hycar nonionic acrylic emulsions (Noveon, Ohio) to name a few.

The paint formulation of the waterborne diffracting, color shifting paint and the an organic based, diffracting, color shifting paint, above may be urethane based with a nonionic polyisocyanate crosslinking agent such as: aliphatic isocyanate monomer containing two tertiary aliphatic diisocyanate groups (e.g. TMXDI, CYTEC Industries), polyisocyanate resins (e.g. CYTHANE 3174, CYTEC Industries), polyisocyanates (e.g. DESMODUR polyisocyanates, Bayer), and aliphatic polyisocyanates (e.g. Rhodocoat X EZ-D 40, Rhodocoat X EZ-M 501 or Rhodocoat X EZ-M 502 polyisocyanate, Rhodia, N.J.) to name a few commercially available products.

EXAMPLES

The following examples are intended to illustrate the invention and should not be construed as limiting the invention in any way.

Example 1

Synthesis of Highly Charged Monodisperse Polystyrene Spheres

Monodisperse, highly charged polystyrene spheres were synthesized by emulsion polymerization using a 3-neck jacketed glass cylindrical reaction vessel equipped with a high-torque mechanical stirrer. The temperature was maintained through the jacket with the use of a circulating temperature bath. Divinyl benzene (DVB) was used after inhibitor was removed by passing the monomers though a column of aluminum oxide. Sodium 1-allyloxy-2hydroxypropane sulfonate (COPS-1) ionic comonomer (Rhone-Poulenc), Aerosol MA-80-1 surfactant (Cytec), Sodium bicarbonate and ammonium persulfate were used as received.

The reaction vessel was charged with the ultrapure water (Bamstead Nanopure water purification system) containing sodium bicarbonate. A nitrogen blanket and a stirring rate of 350 rpm were maintained throughout the reaction. The water solution was deoxygenated by bubbling with nitrogen for 40 min. After thorough deoxygenation, the Aerosol MA-80, dissolved in 10 ml of water, was added and the temperature was increased to 50° C. Previously deinhibited and deoxygenated styrene and DVB were injected at a rate of 4 ml/min. The COPS-1 was dissolved in 10 ml of water and was injected 5 min after the addition of styrene and DVB was completed. The temperature was increased to 70° C. (±1° C.), at which point the solution of ammonium persulfate in 5 ml of water was injected. The reaction was left to reflux for 3-4 h.

An important parameter to control the highly charged surface is that a sufficient amount of ammonium persulfate was maintained during the reaction. Therefore, in order to achieve this ammonium persulfate was added during the reaction with additions of, for example, 0.05% to 0.25% ammonium persulfate during the polymerization reaction.

| Ingredient | % |
|---|---|
| Water | 67.2% |
| MA-80 | 0.6% |
| Sodium bicarbonate | 0.1% |
| Styrene | 27.2% |
| DVB | 2.8% |
| COPS 1 | 1.7% |
| Ammonium persulfate | 0.4% |

Example 1 reaction yielded highly charged monodispersed polystyrene spheres 215±6 mm. The particles were cleaned by dialysis and with ion exchange resin.

Example 2

Synthesis of Highly Charged Monodisperse Polystyrene Spheres

The emulsion polymerization reaction was similar to that described in example 1. The following table lists the different ingredients:

| Ingredient | % |
|---|---|
| Water | 69% |
| MA-80 | 0.9% |
| Sodium bicarbonate | 0.1% |
| Styrene | 28% |
| COPS 1 | 1.6% |
| Ammonium persulfate | 0.4% |

The reaction was left to reflux for 3-4 h. During the reaction 0.3% wt of COPS 1 and 0.1% of Ammonium persulfate were added.

Example 2 reaction yielded highly charged monodispersed polystyrene spheres 130±5 nm. The particles were cleaned by dialysis and with ion exchange resin.

Example 3

Synthesis of Highly Charged Monodisperse Polystyrene Spheres

The emulsion polymerization reaction was similar to that described in example 1. The following table lists the different ingredients:

| Ingredient | % |
|---|---|
| Water | 62.4% |
| MA-80 | 0.7% |
| Sodium bicarbonate | 0.1% |
| Styrene | 34.7% |
| COPS 1 | 1.7% |
| Ammonium persulfate | 0.4% |

The reaction was left to reflux for 3-4 h. During the reaction 0.1% of Ammonium persulfate were added to the reaction flask.

Example 3 reaction yielded highly charged monodispersed polystyrene spheres 150±8 nm. The particles were cleaned by dialysis and with ion exchange resin.

Example 4

Synthesis of Highly Charged Monodisperse Spheres Through Emulsifier-Free Polymerization Monodisperse highly charged polystyrene spheres were synthesized by emulsifier-free polymerization using a jacketed reaction flask, which contained a mechanical Teflon stirrer. The reaction flask contained a temperature sensor and a nitrogen inlet. The temperature was maintained through the jacket with a circulating temperature bath.

The reaction flask was charged with 200 ml of DI water containing 70 g styrene, 2.0 g COPS-1, and varying amounts of sodium chloride. A nitrogen blanket and a stirring rate of 350 rpm were maintained throughout the reaction. The solution was thoroughly deoxygenated by bubbling with nitrogen prior to the reaction for 30 minutes. After the thorough deoxygenation, the temperature was increased to 70° C., and a solution of 0.1 g ammonium persulfate in 5 ml of water was injected. The reaction was left to reflux for 6 h. Then a second addition of 0.02 gr ammonium persulfate was performed.

Upon completion of the reaction, the product appeared milky white. After allowing the completed reaction to cool, the colloid solution was filtered through previously boiled glass wool and the filtrate was centrifuged into a pellet. The supernatant liquid was removed and pure water was added to the pellet, which was then sonicated to disperse the individual particles. This procedure was repeated until Bragg diffraction was observed (usually three repetitions). Ion exchange resin was added to the solutions for further purification and storage.

Example 5

Monodisperse Silica Core Particles with Highly Charged Polystyrene Shell

Monodisperse silicon dioxide ($SiO_2$) spheres can be easily synthesized with the Stöber process. The size of silica and the monodispersity can be controlled by use of specific water:ammonia ratio. A typical Stöber recipe utilizes a mixture of 25 mL of deionized water and 2 mL of ammonium hydroxide (14 M), which was poured into a mixture of 70 mL of ethanol and 6 mL of TEOS (tetraethyl orthosilicate) under stirring. After 2 h, 300 nm monodisperse silica particles are formed, with relative standard deviations of 4%.

The resulting monodisperse $SiO_2$ spheres were then reacted with MPS (3-(trimethoxysilyl)propyl methacrylate) to attach polymerizable vinyl groups onto the silica surfaces. A polymer shell was attached to these modified $SiO_2$ particles through the copolymerization of styrene and DVB (divinyl benzene) during a dispersion polymerization reaction.

In one example, the surface-functionalized silica particles, dispersed in ethanol (250 mL, containing 5 g of silica particles), were mixed with 0.6 g of PVP (poly(vinylpyrrolidone), MW 360K, 0.2 g of AIBN (2,2-azobisisobutyronitrile, Aldrich), 2 g of St, 2 g of DVB and then heated to 60° C. for 3 h under stirring. At that time 0.2 gr of COPS-1 and 0.02 gr of AIBN were added to the reaction flask and were allowed to react for 1 hour.

The core-shell particles were collected by centrifugation and cleaned by repeated centrifugation and ultrasonic dispersion in ethanol. The particles are monodisperse (5% polydispersity) with an average diameter of 400 nm.

Example 6

Thermally Curable Paint

The paint was formulated as follows:

| | |
|---|---|
| Highly charged Monodisperse colloidal particle 215 ± 6 nm. | 67.7% |
| Glycerol (Humectant) | 19.86% |
| Aam | 9% |
| Bis AAm | 0.9% |
| BYK 348 (wetting agent) | 2% |
| BYK 022 (water defoamer) | 0.5% |
| AIBN | 0.04% |

The paint was applied by brush or sprayed on a resin coated paper and on glass slide. A highly diffracting green coating was formed upon thermal cure at 60° C.

Example 7

UV Curable Paint

| | |
|---|---|
| Highly charged Monodisperse colloidal particle 150 ± 5 nm | 69.55% |
| Diethylene glycol | 15% |
| HEMA | 12.4% |
| PEG-DMA 200 | 0.5% |
| BYK 348 (wetting agent) | 2% |
| Defoamer | 0.5% |
| DEAP (10% in DMSO) | 0.05% |

The paint was applied by brush or sprayed on a resin coated paper and on glass slide. A highly diffracting purple coating was formed upon UV cure at 60° C.

While the present disclosure has been described in connection with preferred embodiments thereof, those of ordinary skill in the art will recognize that many modifications and variations are possible. For example, it can be contemplated that the highly charged polymeric spheres of the present invention can find useful practical applications in connection with drug delivery and contrast agent diagnostics. The present disclosure is intended to be limited only by the following claims and not by the foregoing description which is intended to set forth the presently preferred embodiment.

What is claimed is:

1. A method of making monodisperse spheres having diameters in the 10 to 10,000 nanometer range and having a surface charge density of at least 2 $\mu C/cm^2$ through polymerization and comprising the steps of:
   maintaining the concentration of an initiator during polymerization to be approximately 1 wt. %; and
   maintaining the concentration of an ionic monomer during polymerization to be approximately 2 wt. %.

2. The method of claim 1 wherein the initiator introduces acid groups to the surface of the spheres.

3. The method of claim 2 wherein the initiator is selected from the group consisting of ammonium persulfate, potassium persulfate and disodium 2,2'-azobis-2-cyanopropane-1-sulphonate.

4. The method of claim 1 wherein the ionic monomer introduces charged groups to the surface of the spheres.

5. The method of claim 4 wherein the ionic monomer is selected from the group consisting of polymerizable surfactants, 1-sodium allyoxy hydroxypropyl sulfonate, 2-acrylamido-2-methylpropane sulfonic acid and 2-hydroxy ethyl methacrylate acid and styrene sulfonate.

6. The method of claim 1 comprising at least one of the following: emulsion polymerization, dispersion polymerization, surfactant free polymerization, condensation and precipitation reactions.

7. The method of claim 1 wherein the spheres are selected from the group consisting of organic polymers, metals, metal oxides, metal sulfides, core-shell spheres and ferroelectric materials.

8. The method of claim 7 wherein the spheres include at least one of the following: polystyrene, polymethyl methacrylate, melamine formaldehyde resin, fluorinated methyl methacrylate, acrylic latexes, methacrylic latexes, vinyl ester latexes, polymer coated silica, polymer coated titania, polymer coated zinc sulfide, polymer coated zirconia, polymer coated aluminum oxide, polymer coated iron oxide, polymer coated cobalt oxide, polymer coated cadmium sulfide, and polymer coated lead sulfide.

9. A composition comprising polymeric spheres of high surface charge density that can Bragg diffract light in both wet and dry states.

10. The composition of claim 9 wherein the polymeric spheres have diameters in the 10 to 10,000 nanometer range.

11. The composition of claim 9 wherein the polymeric spheres have a surface charge density in the range of approximately 2 $\mu C/cm^2$ to approximately 10 $\mu C/cm^2$.

12. The composition of claim 9 wherein the polymeric spheres have a surface charge density of at least about 10 $\mu C/cm^2$.

13. A composition comprising:
   polymeric spheres having high surface charge densities that can Bragg diffract light in both wet and dry states;
   at least one co-solvent;
   film forming monomers; and
   additives.

14. A waterborne diffracting, color shifting paint, comprising:
   approximately 5-40 wt. % monodispersed polymeric particles having high surface charge densities that can Bragg diffract light in both wet and dry states;
   approximately 50-90 wt. % water;
   approximately 0-25 wt. % humectant;
   approximately 0-5 wt. % wetting agent;
   approximately 0-5 wt. % defoamer;
   approximately 5-40 wt. % film forming material;
   approximately 0-2 wt. % initiator; and
   fungicides.

15. An organic based, diffracting, color shifting paint, comprised of:
   approximately 5-40 wt. % monodispersed polymeric particles having high surface charge densities that can Bragg diffract light in both wet and dry states;
   approximately 50-90 wt. % organic solvent;
   approximately 0-25 wt. % humectant;
   approximately 0-5 wt. % wetting agent;
   approximately 0-5 wt. % defoamer;
   approximately 5-40 wt. % film forming material; and
   approximately 0-2 wt. % initiator.

16. A composition comprising:
   spheres having high surface charge densities that can Bragg diffract light in both wet and dry states;
   at least one co-solvent;
   film-forming monomers, oligomers or latexes; and
   additives.

17. A waterborne diffracting, color shifting paint, comprising;
   approximately 5-40 wt. % monodispersed polymeric particles having high surface charge densities that can Bragg diffract light in both wet and dry states;
   approximately 50-90 wt. % water;
   approximately 0-25 wt. % nonionic cosolvent;
   approximately 0-5 wt. % nonionic wetting agent;
   approximately 0-5 wt. % nonionic defoamer;
   approximately 5-40 wt. % nonionic film forming material;
   approximately 0-10% nonionic crosslinking agent;
   approximately 0-10% nonionic coalescing agent;
   approximately 0-2% wt. initiator; and
   fungicides.

18. The paint of claim of 17 wherein the nonionic film forming material is selected from the group consisting of nonionic urethane, melamine, acrylic derivatives in monomers, methacrylic derivatives in monomers, oligomers and latex form.

19. The paint of claim 18 wherein the nonionic film forming material is selected from the group consisting of polyurethane diols, aliphatic polyether waterborne urethane polymers, and nonionic acrylic emulsions.

20. The paint of claim 17 wherein the nonionic crosslinking agent is a nonionic polyisocyanate crosslinking agent.

21. The paint of claim 20 wherein the nonionic crosslinking agent is selected from the group consisting of aliphatic isocyanate monomer containing two tertiary aliphatic diisocyanate groups, polyisocyanate resins, polyisocyanates, and aliphatic polyisocyanates.

22. An organic based, diffracting, color shifting paint, comprised of:
   approximately 5-40 wt. % monodispersed polymeric particles having high surface charge densities that can Bragg diffract light in both wet and dry states;
   approximately 50-90 wt. % organic solvent;
   approximately 0-25 wt. % cosolvent;
   approximately 0-5 wt. % wetting agent;
   approximately 0-5 wt. % defoamer;
   approximately 5-40 wt. % film forming material; and
   approximately 0-2 wt. % initiator.

23. The paint of claim of 22 wherein the nonionic film forming material is selected from the group consisting of nonionic urethane, melamine, acrylic derivatives in monomers, methacrylic derivatives in monomers, oligomers and latex form.

24. The paint of claim 23 wherein the nonionic film forming material is selected from the group consisting of polyurethane diols, aliphatic polyether waterborne urethane polymers, and nonionic acrylic emulsions.

25. The paint of claim 22 wherein the nonionic crosslinking agent is a nonionic polyisocyanate crosslinking agent.

26. The paint of claim 25 wherein the nonionic crosslinking agent is selected from the group consisting of aliphatic isocyanate monomer containing two tertiary aliphatic diisocyanate groups, polyisocyanate resins, polyisocyanates, and aliphatic polyisocyanates.

27. The method of claim 1 wherein the surface charge density of each of the spheres is at least about 5 $\mu C/cm^2$.

28. The method of claim 1 wherein the surface charge density of each of the spheres is at least about 10 $\mu C/cm^2$.

* * * * *